UNITED STATES PATENT OFFICE 2,066,721

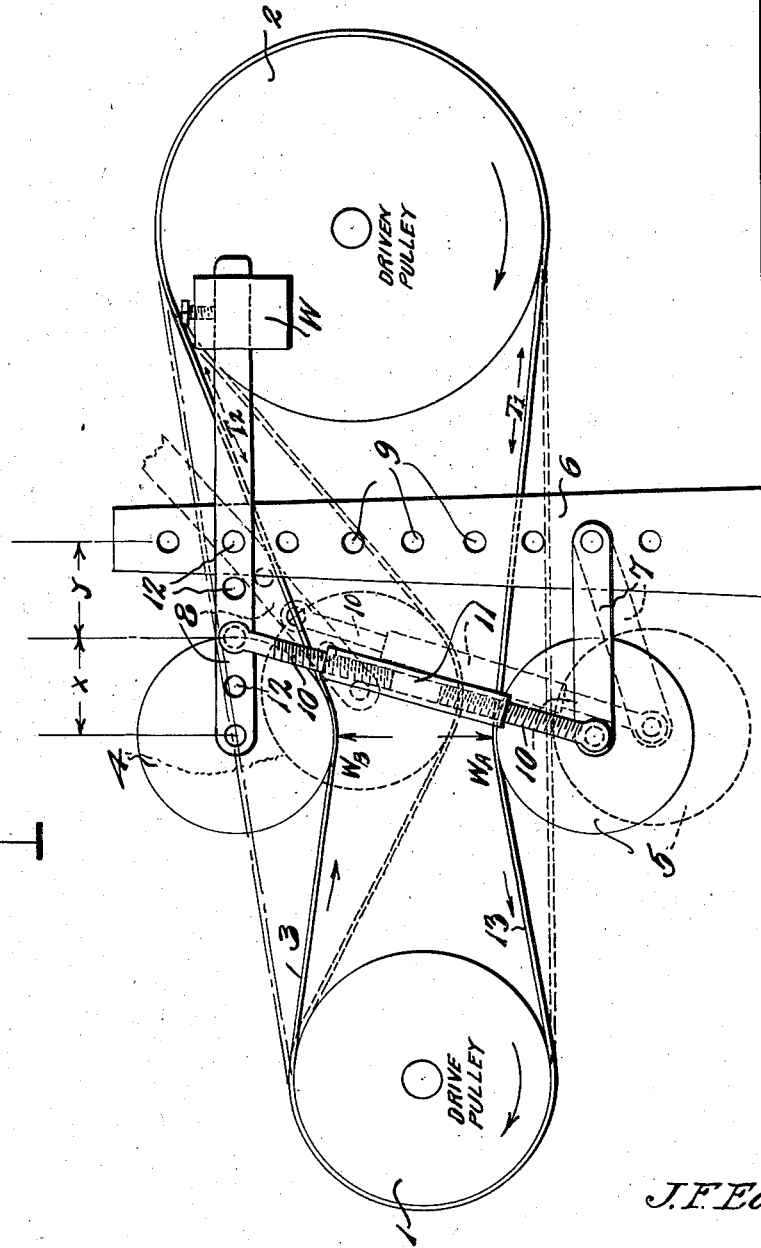

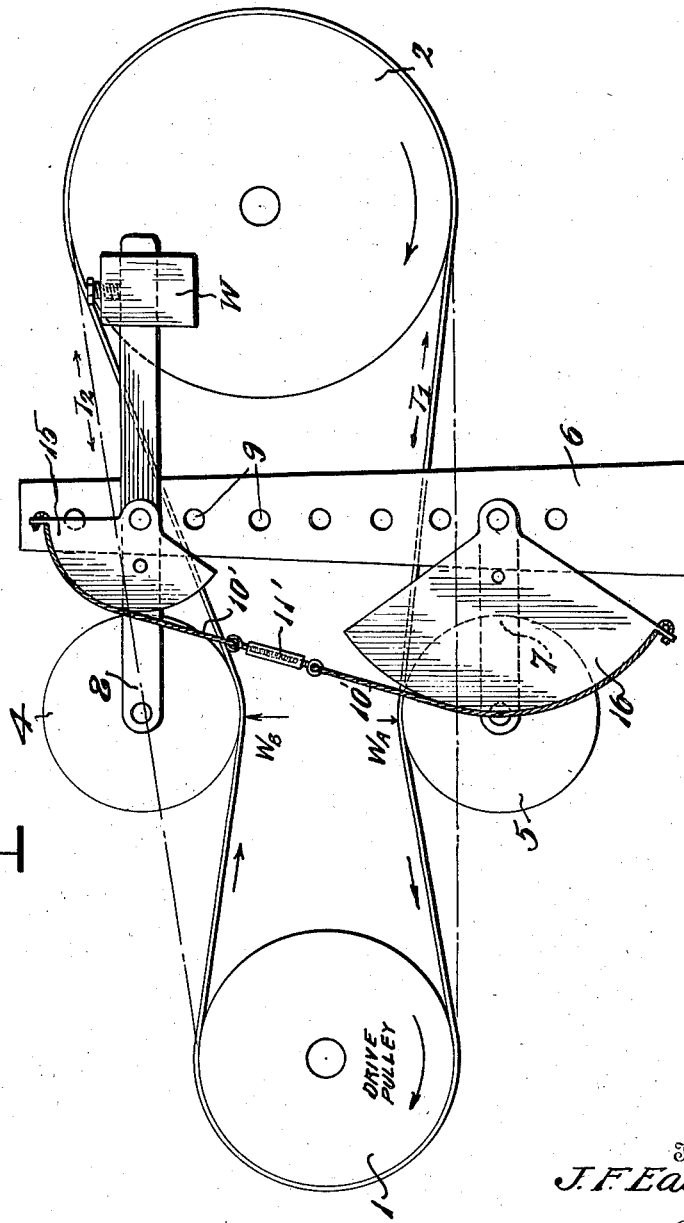

BELT TIGHTENING MEANS

John F. Eaton, Tulsa, Okla., assignor to Jarecki Manufacturing Company, Tulsa, Okla., a corporation Application May 22, 1935, Serial No. 22,837

11 Claims. (Cl. 74—242.9)

This invention appertains to the transmission of mechanical power by means of flexible connectors such as belts, cords and the like, and more particularly, to belt tightening means for taking up the slack which occurs in such belting during operation of the same.

The new invention which will be hereinafter disclosed is particularly applicable to variable torque drives, as will become apparent as the description proceeds.

One common type of belt tightener is the well-known stationary idler which comprises an idler pulley adapted to bear on the running slack side of the belt. In use, these stationary idlers are set so as to impart an initial tension on the belt, which tension is more or less maintained during operation for that particular setting of the idler. Sometimes, the idler is adjustably mounted so that the setting may be changed as desired. However, in the case where the power transmitted by the belt fluctuates or changes over a wide range, the idler must be readjusted to produce the proper initial tension so as to prevent slippage of the belt and to secure the proper arc of contact between the belt and the driving pulley. Where the fluctuation is rapid, or where loads are suddenly imparted on the belt, it is impossible and impractical to repeatedly change the idler adjustment so as to compensate for these changes. Therefore, it has been customary to maintain a very high initial tension in the belt to secure results which are reasonably satisfactory.

A second common type of idler is the hinged or pivoted idler which may be weighted to secure the desired belt tension. Here again, high initial tension must be imparted in order to secure reasonably satisfactory operation.

In each of the cases above mentioned, the high initial tension tends to reduce the elasticity of the belt and reduces its resistance to shock, thereby causing high working stresses resulting in shortened belt life. Since the high initial tension imparted by these idlers to the belt remains even when the drive is idle or shut down, the belt soon loses its elasticity and becomes lifeless.

Stationary idlers are only suited for constant torque drives. While pivoted or hinged weighted idlers are an improvement over stationary idlers, they are practical only for moderate variations in torque or belt load. This becomes obvious when it is considered that the tension in the tight side of the belt increases with increase in belt load or power transmitted thereby, thus stretching the belt and producing additional slack in the slack side of the belt. Where an increased load is suddently imparted to the belt, the increased slack in the slack side of the belt causes the belt to slip, due to the fact that in the case of the stationary idlers the belt leaves the idler, and in the case of the pivoted weighted idlers, the inertia of the idler prevents the same from taking up the additional slack quickly enough to prevent slippage. With such idlers, shock loads must thus be absorbed almost entirely by the tight side of the belt. There are quite a number of applications where wide load fluctuations and sudden impact loads are encountered. Oil well pumping is one example. In setting the usual idlers so as to enable the pump to be operated with any degree of success, it is necessary to adjust the same to the peak loads, thereby resulting in overstresing the belt for the average loads, but even with such settings, considerable slippage occurs with the stationary idlers due to their inability to take up the slack in the belt which results from the application of sudden load impacts on the belt. With the pivoted weighted idlers, the idler cannot drop quickly enough to counteract the stretch of the belt, resulting in the idler tending to bounce on the belt so that it is prevented from maintaining a uniform slack side tension.

One of the objects of this invention is to provide an idler device which will effectively adjust the tension in the belt to prevent slippage and secure the proper arc of contact between the belt and the drive pulley irrespective of load fluctuation and over a comparatively wide range of such fluctuation.

Another object of the invention is to maintain a substantially constant ratio between the tension in the tight and slack sides of the belt or whatever form the flexible connector may have.

A still further object of the invention is to automatically maintain the greatest belt efficiency substantially equivalent to ideal belt operating conditions irrespective of the load variation.

Still another object of the invention is to provide a device whereby the tight side belt tension controls or regulates the slack side tension and maintains a uniform difference in tension for any degree of load in accordance with any predetermined optimum ratio.

The invention further contemplates the automatic release of all or a part of the tension in the belt when the drive is idle or shut down, thereby permitting the belt to resume its normal length and shape and prevent loss of elasticity, resulting in prolonged belt life.

Other and further objects of the invention will be hereinafter set forth and the advantages thereof defined in the appended claims.

In the drawings:

Fig. 1 is a somewhat diagrammatic view in elevation of a device embodying the new invention.

Fig. 2 is a view generally similar to Fig. 1 and disclosing a modified form of the invention.

Like reference characters designate corresponding parts in the several figures of the drawings.

Referring first to the form of the invention illustrated in Fig. 1, 1 designates a drive member, and 2 a driven member, each of which members embodies a pulley about which the flexible connector or belt 3 is trained in the usual manner to transmit power from the driving member to the driven member. Intermediate said pulleys 1 and 2, and coacting with the opposite running portions of the belt, are disposed a pair of idler pulleys 4 and 5. Each of these idler pulleys is swingably or pivotally mounted on a standard or support 6 through means of supporting arms 7 and 8, the pulleys 5 and 4 being respectively rotatably mounted at the outer extremities of said arms. If desired, the standard 6 may be provided with means for adjustably mounting the pivoted ends of said arms 7 and 8, as for example, by means of the openings 9 affording various positions of adjustment of the fastening means interconnecting the arms 7 and 8 with the standard 6.

Interconnecting the arms 7 and 8, is a link member 10, the opposite ends of which are respectively pivotally connected to the arms to permit the latter to swing in a manner hereinafter described more fully. The connecting member or link 10 is adjustable through any suitable means, as for example, by the oppositely threaded sleeve 11 which threadably receives the ends of the complemental sections of the link 10. Rotation of said sleeve affords an adjustment of the effective length of the link 10, whereby the arms 7 and 8 are correspondingly adjusted closer together or farther apart, as desired. The point of connection of the link 10 with the arm 8 is intermediate the axis of the idler 4 and the pivotal axis of the arm 8, for reasons which will hereinafter become more apparent. Preferably, this connection is adjustable radially of the arm 8 in any desirable manner. As shown, the arm is provided with a series of openings 12 for pivotally receiving the bolt or other fastening device through means of which the link 10 is connected to said arm.

Assuming the drive to be in the direction shown by the arrows associated with the pulleys, the lower running side of the belt is the tight side, and the upper side of the belt the slack side. By the expressions "tight" and "slack" sides, is meant the side of the belt which moves towards the driving member and the side of the belt which moves away from the driving member, respectively. Also, the term "belt" is used herein and in the appended claims in a broad sense and is substantially synonymous with the expression "flexible connector". The latter expression, as known to the art, embraces belts, cords, chains, etc.

Let it be assumed by way of example that the link 10 is connected as shown in Fig. 1, the upper end being connected to the supporting arm 8 substantially midway between the ends of the latter, and that the effective length of the link 10 is adjusted to cause the arms 7 and 8 to assume substantially horizontal parallel positions. The belt 3 is of such length as to have some slack therein, and this slack, as shown, is taken up by the idler pulleys 4 and 5 respectively. For the purposes of this example, it is further assumed that there is no initial tension in the belt, and that the idler device is counterbalanced, as by the counterbalance weight W, so that in a position of rest, the parts are as shown in Fig. 1. Now, when the drive pulley is rotated to take up the load of the driven member, the lower side of the belt tends to move downwardly towards the position shown by the dash line 13. The extent to which the lower side of the belt is straightened, depends on the amount of the load and the suddenness of the load assumption. It is apparent that a tension $T_1$ is created in the lower or tight side of the belt. As this side straightens in assuming the load, the idler pulley 5 is forced downwardly with a force equal to $W_A$. In so moving, the link 10 exerts a downward pull on the idler pulley 4, which bears on the slack side of the belt, creating a pressure $W_B$. It has been assumed that $x=y$ where $x$ is the distance between the axis of the idler pulley 4 and the point of connection of link 10 with the supporting arm 8; and $y$ equals the distance between the pivotal axis of the supporting arm 8 and the point of connection of the link 10 to said arm. Then, if $x+y=z$ where $z=$the length of the supporting arm 7 for the idler 5, the pivotal motion of the idler $4=2\times$the motion of idler 5. As shown therefore, the idler ratio is 2:1, and therefore, $$\frac{T_1}{T_2}=\frac{\text{tight side tension}}{\text{slack side tension}}=\frac{2}{1}$$

Since the tensions $T_1$ and $T_2$ are approximately proportionate to the forces $W_A$ and $W_B$,—it will be seen that by varying the ratio $x/y$, various relations between $W_A$ and $W_B$ can be obtained. It is realized that since $T_1$ and $T_2$ are components of the forces $W_A$ and $W_B$ respectively, the difference in deflection from a straight line of the tight and slack sides of the belt may slightly affect the actual values of $T_1$ and $T_2$ caused by the forces $W_A$ and $W_B$, but this can be compensated for by corrections in the ratio of $x$ to $y$. However, the relation in tension between $T_1$ and $T_2$ will be approximately maintained for any value of $T_1$ since the relation between $W_A$ and $W_B$ remains constant for any setting of the length of link 10, and for a given ratio $x/y$.

It is advantageous in operating belts to maintain a certain relation between the tight and slack side tensions, said relation being a function of the coefficient of friction between the belt and the pulley and the arc of contact. For example, in the case of a rubber belt, it has been found that the coefficient of friction is 0.25, and the arc of contact should be 180°. By choosing the correct ratio between $x$ and $y$, the relation $$W_A:W_B=2.19:1$$

can be obtained, and the desired optimum ratio between $T_1$ and $T_2$ is obtained. It has been found that this ratio in tension between the tight and slack sides of the belt will be maintained substantially constant over a wide variation in the load or power being transmitted, and that this result is attained automatically and without attention of the operator. It will be noticed that since idler pulley 4 drops twice as fast as idler pulley 5 as the load on the belt increases, the arc of contact of the belt on the drive pulley is automatically increased with this increase of load, thereby reducing the tendency of the belting to slip.

Another advantage in the case of suddenly applied impact loads, such as are encountered in oil well pumping, is that these loads cause automatic and instantaneous tightening of the belt before slippage can occur. A sudden increase in $T_1$ produces a proportionate increase in $T_2$, resulting in increased stretch of both the tight and slack sides of the belt, so that both sides of the belt absorb the shock and the belt is tightened before slippage can occur. With ordinary idlers of the stationary or weighted type, no increase in slack side tension occurs under shock loads and slippage occurs before the change in tight side tension can be felt by the idler. As a matter of fact, with stationary idlers, the slack side tension is actually decreased because the increased belt stretch makes the belt tend to leave the idler, and all of the shock must be assumed by the tight side of the belt; while with the pivoted and weighted idlers, the slack side tension is only kept constant for moderate variations in torque and henceforth moderate variations of $T_1$. The tension $T_2$ cannot be increased in proportion to $T_1$, but remains constant so that when suddenly applied impact loads occur, the inertia of the idler prevents it from maintaining a uniform slack side tension. Such an idler cannot drop quickly enough to counteract these instantaneous increases in $T_1$, and the result is that the belt slips and the idler tends to bounce on the belt so that it is unsuited for this work.

While it is possible to set a stationary idler for the optimum ratio $$T_1/T_2 = 2.19/1$$

this ratio will be maintained for only one value of the load or power being transmitted. A decrease in load will decrease the ratio $T_1/T_2$, while an increase in load will increase the ratio $T_1/T_2$. Similarly, with the pivoted weighted idlers, the optimum ratio of $T_1/T_2$ can exist only for one value of the load or power being transmitted, and while the ratio $T_1/T_2$ does not vary between as wide limits as with a stationary idler, nevertheless, the pivoted weighted idlers are not adapted for a wide range of load variation or fluctuation. Thus the belt drives employing the usual types of idlers operate at peak efficiency for only one value of the load for any one given idler setting, and a decrease in load causes unnecessary high belt stress, being equivalent to using unnecessarily high initial tension ($T_0$), while an increase in load results in insufficient slack side tension due to belt stretch.

With the new idler construction disclosed herein, there is automatically maintained at all values of the load, a substantially constant ratio of $T_1/T_2$, which ratio may be the optimum value selected for any type of belt, arc of contact, or operating conditions. Thus ideal belt operating conditions and the greatest belt efficiency are obtained automatically at various loads, or on drives running under variable load.

By adjusting the length of the link 10 or the value of the counterweight W, all or a part of the running load can be automatically removed from the belt when the drive is idle or shut down. For example, if $T_1$ drops to zero, $W_A$ will equal zero, and likewise, $T_2$ and $W_B$ will equal zero where the counterbalance W exactly balances the weight of the idler pulleys and the arms 7 and 8, and the link 10. In practice, a small initial tension ($T_0$) may be left in the belt, either by not using the counterweight or by shortening the effective length of the link 10. This will result in easier starting.

Referring now to the modified construction shown in Fig. 2, the parts are generally the same, except as respects the link 10, which has been replaced by a cable or wire rope 10', the ends of which are trained over the circular faces of circular segments 15 and 16 respectively, fixed to the supporting arms 8 and 7. The radius of segment 15 corresponds to the distance $y$, and the radius of segment 16 corresponds to the distance $z$. As in the case of the rigid link 10, the cable or wire rope 10' includes a turn-buckle or equivalent device 11' for adjusting the effective length of the cable. By the proper selection of the segment radii, the optimum ratio of $x:y$ may be obtained, and hence, the optimum ratio of $T_1:T_2$. The principle of operation of the modified form of the invention is exactly the same as in the form illustrated in Fig. 1, and therefore, further detailed explanation is unnecessary.

It is intended and contemplated that various vibration dampening devices such as springs, counterweights, pneumatic or hydraulic dashpots, and the like, may be used to restrict the motion or vibration of the idler pulleys or arms when excessive shock loads or excessive torque variations are encountered in operation. Such dampening devices have not been shown, as attachment of the same to the arms or the shafts should be obvious to those skilled in the art. Only occasionally would these dampening devices be necessary in practice. It is also to be understood that in practice it is not always necessary to counterbalance the dead-weight of the idler unit and the same may be omitted without seriously affecting the maintenance of a constant ratio between $T_1$ and $T_2$.

By way of summary, the improved idler construction disclosed herein automatically maintains a constant ratio between the tight and slack side tensions of the flexible connector, irrespective of the power fluctuations, and this ratio can be adjusted to the optimum value for any given set of operating conditions. Automatic and instantaneous adjustment of belt tension is afforded when the flexible connector is subjected to instantaneous shock loads, the shock being cushioned by both the tight and slack sides of the belt. The invention also affords automatic increase in the arc of contact of the flexible connector with the driving pulley when the load increases, and if desired, the adjustment may be such that all or a part of the load on the flexible connector may be automatically relieved when the drive is shut down.

It is to be understood that the specific optimum ratio 2.19 to 1, referred to herein, has been given only by way of example, as different operating conditions will usually require the selection of respectively different optimum ratios.

In describing the new invention, reference has been made to various levers or links and arms. It is to be understood that this has been essentially for the purpose of illustration and for the purposes of simplifying explanation. Instead of a simple mechanical arrangement as disclosed, the same results might be accomplished through the application of hydraulic and electrical principles. It is further to be understood that while certain specific details of construction have been herein shown and described, the invention is not to be confined thereto as changes and alterations may be made therein without departing from the spirit thereof as defined by the appended claims.

Having thus described my invention, what I claim as new and desire to secure by Letters Patent, is—

1. In a device of the class described, the combination of a driving member, a driven member, a flexible connector extending about said members for transmitting power from the driving member to the driven member, and means for maintaining a uniform difference in tension between the slack and tight sides of the flexible connector in accordance with a predetermined optimum ratio and irrespective of the load transmitted by the flexible connector, said means including means regulated by the tight side tension and producing a substantially greater tight side tension than slack side tension.

2. In a device of the class described, the combination of a driving member, a driven member, a flexible connector extending about said members for transmitting power from the driving member to the driven member, means acting upon said flexible connector to create tension in the slack and tight sides of said flexible connector, said means comprising shiftable members bearing respectively on the tight and slack sides of the flexible connector, with a positive inelastic connection therebetween serving to create a substantially greater tight side tension in the flexible connector than slack side tension, which is maintained as a constant ratio one to the other irrespective of variations of power transmitted, and means for automatically reducing the said tension ratio when the power transmitted is discontinued.

3. In a device of the class described, the combination of a driving member, a driven member, a flexible connector extending about said members for transmitting power from the driving member to the driven member, means acting upon said flexible connector to create a substantially greater tight side tension than slack side tension in said flexible connector, bearing a constant ratio one to the other over a relatively wide range of power transmitted, and means for automatically reducing the said tension ratio to an extent where the initial tension becomes approximately zero when the power transmission is discontinued.

4. The combination with a driving member, a driven member, and a flexible connector extending about said members for transmitting power from the driving to the driven member, of means for automatically increasing the arc of contact between the driving member and the flexible connector incident to increase of power transmitted, said means comprising a support, separate means pivotally mounted on said support and acting respectively on opposite runs of the flexible connector, and means positively interconnecting said last mentioned means so as to create a substantially uniformly greater tension in the tight run of the flexible connector than in the slack run responsive to the tight run tension.

5. The combination with a pair of pulleys and a belt connecting said pulleys, of means automatically controlled by the difference in the tension in respective opposite running portions of the belt for automatically taking up slack in said belt incident to variation of power transmitted by the belt, said means including a pair of idler pulleys engaging said oppositely running portions of the belt, a pivotal support for each idler pulley, and means interconnecting said pivotal supports for causing pivotal movement of one support incident to pivotal movement of the other support, said interconnecting means being connected to one of said pivotal supports intermediate its idler pulley and the pivotal axis of the support, whereby the ratio of the pivotal movement of the idler coacting with the slack side of the belt to the pivotal movement of the idler coacting with the tight side of the belt is substantially greater than unity.

6. The combination with a pair of pulleys and a belt connecting said pulleys, of means automatically controlled by the difference in the tension in respective opposite running portions of the belt for automatically taking up slack in said belt incident to variation of power transmitted by the belt, said means including a pair of idler pulleys engaging said opposite running portions of the belt, a pivotal support for each idler pulley, and means interconnecting said pivotal supports for causing pivotal movement of one support incident to pivotal movement of the other support, said last mentioned means including an inelastic member having its opposite ends connected with the respective idler supports at distances unequally removed from the pivotal axes of said supports and positioned at the same side of said axes as the idler pulleys.

7. The combination with a pair of pulleys and a belt connecting said pulleys, of means automatically controlled by the difference in the tension in respective opposite running portions of the belt for automatically taking up slack in said belt incident to variation of power transmitted by the belt, said means including a pair of idler pulleys engaging said opposite running portions of the belt, a pivotal support for each idler pulley, and means interconnecting said pivotal supports for causing pivotal movement of one support incident to pivotal movement of the other support, said last mentioned means including an inelastic member having its opposite ends connected with the respective idler supports at distances unequally removed from the pivotal axes of said supports and positioned at the same side of said axes as the idler pulleys, the distance between the pivotal axis of the slack side idler support and the connection of the interconnecting means aforesaid thereto being less than the distance between the pivotal axis of the tight side idler support and the connection of said interconnecting means to the latter.

8. The combination with a pair of pulleys and a belt connecting said pulleys, of means automatically controlled by the difference in the tension in respective opposite running portions of the belt for automatically taking up slack in said belt incident to variation of power transmitted by the belt, said means inluding a pair of idler pulleys engaging said opposite running portions of the belt, a pivotal support for each idler pulley, means rigidly interconnecting said pivotal supports on the same side of the pivotal axes of the supports as the idler pulleys for causing pivotal slack take-up movement of one support to take up slack in one run of the belt incident to pivotal movement of the other support caused by tension on the opposite run of the belt, and means for adjusting the effective length of said interconnecting means to vary the ratio of angular movement of the respective idler supports.

9. The combination with a pair of pulleys and a belt connecting said pulleys, of means automatically controlled by the difference in the tension in respective opposite running portions of the belt for automatically taking up slack in said belt incident to variation of power transmitted by the belt, said means including a pair of idler pulleys engaging said opposite running portions of the belt, a pivotal support for each idler pulley, and means interconnecting said pivotal supports for causing pivotal slack take-up movement of one support to take up slack in one run of the belt incident to pivotal movement of the other support caused by tension on the opposite run of the belt, including a connecting link having its opposite ends connected with the respective idler supports, the connection between the said link and the idler support for the slack side idler being adjustable radially of said support.

10. In a device of the class described, the combination of a driving member, a driven member, a flexible connector extending about said members for transmitting power from the driving member to the driven member, and means acting upon said flexible connector to create tension in the slack and tight sides of said flexible connector, bearing a constant ratio one to the other irrespective of variations of power transmitted, including a circular segment fixed to each of said idler supports, and a cable extending between said idler supports and having its opposite ends fixed to said circular segments and trained over the arcuate faces of said segments.

11. In a device of the class described, the combination of a driving member, a driven member, a flexible connector extending about said members for transmitting power from the driving member to the driven member, and means acting upon said flexible connector to create tension in the slack and tight sides of said flexible connector, bearing a constant ratio one to the other irrespective of variations of power transmitted, including a circular segment fixed to each of said idler supports, a cable extending between said idler supports and having its opposite ends fixed to said circular segments and trained over the arcuate faces of said segments, and means for adjusting the length of said cable.

JOHN F. EATON.